United States Patent [19]

Mamantov et al.

[11] Patent Number: 5,552,241
[45] Date of Patent: Sep. 3, 1996

[54] LOW TEMPERATURE MOLTEN SALT COMPOSITIONS CONTAINING FLUOROPYRAZOLIUM SALTS

[75] Inventors: Gleb Mamantov, deceased, late of Knoxville, Tenn., by Charmaine Mamantov, executor; Josip Caja, Knoxville; Thanthrimudalige D. J. Dunstan, Oak Ridge, both of Tenn.

[73] Assignee: Electrochemical Systems, Inc., Knoxville, Tenn.

[21] Appl. No.: 438,609

[22] Filed: May 10, 1995

[51] Int. Cl.$^6$ .................. H01M 04/36; H01M 04/60; H01M 10/36
[52] U.S. Cl. .................. 429/103; 429/194; 429/196; 429/197; 429/199; 252/62.2
[58] Field of Search .................. 429/103, 194, 429/196, 197, 199, 198; 252/62.2

[56] References Cited

U.S. PATENT DOCUMENTS

| | | | |
|---|---|---|---|
| 4,122,245 | 10/1978 | Nardi et al. | 429/194 |
| 4,463,071 | 7/1984 | Gifford et al. | 429/194 |
| 4,463,072 | 7/1984 | Gifford et al. | 429/194 |
| 4,508,795 | 4/1985 | Mamantov | 429/103 |
| 4,764,440 | 8/1988 | Jones et al. | 429/198 |
| 4,839,249 | 6/1989 | Jones et al. | 429/194 |
| 5,135,825 | 8/1992 | Mori et al. | 429/194 |

OTHER PUBLICATIONS

G. Mamantov et al., "The Use of Tetravalent Sulfur in Molten Chloroaluminate Secondary Batteries," Journal of the Electrochemical Society, vol. 127, No. 11, pp. 2319–2325 (Nov. 1980).

J. S. Wilkes et al., "Dialkylimidazolium Chloroaluminate Molten Salts," Proceedings of the International Symposium on Molten Salts, vol. 81–9, pp. 245–255 (1980) month unavailable.

J. S. Wilkes et al., "Dialkylimidazolium Chloroaluminate Melts: A New Class of Room Temperature Ionic Liquids for Electrochemistry, Spectroscopy, and Synthesis," Inorganic Chemistry, vol. 21, No. 3, pp. 1263–1264 (1982) month unavailable.

G. Mamantov et al., "Rechargeable High Voltage Low Temperature Molten Salt Cell Na/β"–Alumina/SCl$_3^+$ in AlCl$_3$–NaCl," Journal of Electroanalytical Chemistry, vol. 168, pp. 451–466 (1984) month unknown.

A. A. Fannin, Jr., et al., "Properties of 1,3–Dialkylimidazolium Chloride–Aluminum Chloride Ionic Liquids. 2. Phase Transitions, Densities, Electrical Conductivities, and Viscosities," Journal of Physical Chemistry, vol. 88, No. 12, pp. 2614–2621 (1984) month unknown.

R. Marassi et al., "Electrochemical and Spectroscopic Studies of Sulfur in Aluminum Chloride–N–(n–Butyl)Pyridinium Chloride," Journal of the Electrochemical Society, vol. 132, No. 7, pp. 1639–1643 (Jul. 1985).

M. E. Niyazymbetov et al., "Electrochemical Oxidation of Nitroazole Anions," Translated from Izvestiya Akademii Nauk SSSR, Seriya Khimicheskaya, No. 10, pp. 2390–2391 (Oct. 1987).

S. D. Jones et al., "Low Temperature Molten Salt Electrolytes Containing Ternary Alkyl Sulfonium Salts," Proceedings of the Seventh International Symposium on Molten Salts, vol. 90–17, pp. 273–280 (1990) month unknown.

(List continued on next page.)

Primary Examiner—Prince Willis, Jr.
Assistant Examiner—Carol Chaney
Attorney, Agent, or Firm—Preston H. Smirman; Marie E. Smirman; Hayden Patent Group

[57] ABSTRACT

Low temperature molten salt compositions comprised of a mixture of a metal halide, such as but not limited to aluminum trichloride, and a fluoropyrazolium salt, such as but not limited to 1,2-dimethyl-4-fluoropyrazolium chloride, which are resistant towards oxidation over a wide temperature gradient and are useful as electrolytes in electrochemical cells.

34 Claims, 6 Drawing Sheets

OTHER PUBLICATIONS

J. Caja et al., "A Practical Sodium/Sulphur(IV) Molten Chloroaluminate Cell," 17th Intl. Power Sources Symposium held at Bournemouth, Apr. 1991, pp. 333–346 (1991) month unknown.

E. J. Cairns, "A New Mandate for Energy Conversion: Zero Emission (Electric) Vehicles," 35th International Power Sources Symposium held at Cherry Hill, Jun. 22–25, 1992, pp. 310–313 (1992) month unknown.

J. Caja et al., "A Novel Low Temperature Molten Salt System Containing Fluoropyrazolium Salt," Proceedings of the Ninth Intl. Symposium on Molten Salts, vol. 94–13, pp. 752–756 (May 17, 1994).

J. Caja et al., "Development of the Na/β–Alumina/S(IV) Chloroaluminate Cell," Power Sources Conference held at Cherry Hill, Jun. 6–9, 1994, pp. 337–340 (1994).

LOW TEMPERATURE MOLTEN SALT COMPOSITIONS CONTAINING FLUOROPYRAZOLIUM SALTS

FIELD OF THE INVENTION

This invention relates generally to electrolyte compositions useful in the operation of various electrochemical cells, and more particularly to low temperature molten salt compositions containing fluoropyrazolium salts.

BACKGROUND OF THE INVENTION

Since the development of the modern electrochemical cell in the eighteenth century, researchers have attempted to improve upon their performance, durability, and reliability. An electrochemical cell is generally defined as a device from which electricity is obtained as a result of a chemical reaction. A cell consists of two electrodes (an anode and a cathode) immersed in a solution (electrolyte). The chemical reaction take place between the two electrodes and the electrolyte. In a primary cell, current is produced directly as a result of a chemical reaction which is not reversible; however, in a secondary cell the chemical reaction is reversible and the cell can be charged by passing a current through it. Examples of electrochemical cells are dry cells, wet cells, standard cells, fuel cells, solid-electrolyte cells, and reserve cells. A battery is generally defined as a direct current and voltage source made up of one or more cells that convert chemical energy into electrical energy. A battery (and an electrochemical cell) generally consists of an anode, a cathode, a separator, and an electrolyte. Primary batteries, such as those found in a flashlight, for example, can not be recharged, unlike storage batteries, which can be recharged when a current in the reverse direction restores the original chemical state. The lead acid battery, used in automobiles, is the most common example of a storage battery. Electrolytes are generally defined as chemical compounds which when molten or dissolved in certain solvents, will conduct an electric current. In electrolytes the current is carried by positive and negative ions (cations and anions, respectively) rather than by electrons. These ions are present in fused ionic compounds, or in solutions of acids, bases, and salts, which dissociate into ions.

With respect to electrolytes, a class of molten compositions which is of particular interest in the field of electrochemical cells is the class of fused salt compositions which are molten at low temperature. It is important to note that not all fused salt compounds are necessarily molten; they will be solid or liquid based on the temperature. However, with respect to the present application, our discussion will be limited to those fused salt compounds which are also molten at low temperature. Such fused or molten salt compounds are mixtures of compounds (i.e. anions and cations) which are liquid at temperatures below the individual melting points of the component compounds. These mixtures commonly referred to as "melts", can form molten compositions simultaneously upon contacting the components together or after heating and subsequent cooling.

Some examples of low temperature molten or fused salts are chloroaluminate salts formed when alkylimidazolium or pyridinium salts are mixed with aluminum trichloride ($AlCl_3$); and the chlorogallate salts formed by mixing gallium trichloride with methylethylimidazolium chloride. Aluminum trichloride, gallium trichloride, ferric chloride, and indium chloride belong to the class of compounds commonly referred to as metal halides. A metal halide is a compound consisting of a metal and a halogen, generally covalently bonded together. Other types of halides besides the chlorides are the fluorides, bromides, and iodides. Ambient temperature (generally between 20° C. and 35° C.) chloroaluminate melts for use as solvents in high energy rechargeable electrochemical cells have been under development for approximately fifteen years. These melts are generally made of aluminum trichloride and compounds such as N-(n-butyl)pyridinium chloride (BPC), 1-methyl-3-ethylimidazolium chloride (MEIC), trimethylphenylammonium chloride (TMPAC), trimethylsulfonium chloride (TMSC), and trimethylphosphonium chloride (TMPC).

Ambient temperature chloroaluminate melts may be used as electrolytes in the construction of electrochemical cells, batteries, photoelectrochemical cells, and capacitors. They may also be used in electrorefining and electroplating. For a melt to be used efficiently in such applications, it should preferably possess a wide electrochemical window, a high electrical conductivity, and be a liquid over a wide composition range. The electrochemical window is defined as the difference between the anodic and cathodic decomposition voltages of the melt, while the electrical conductivity is generally defined as the ratio of electric current density to the electric field in materials. Among the ambient temperature chloroaluminate melts mentioned above, the $AlCl_3$/BPC and the $AlCl_3$/MEIC melts exhibit the best physical and electrochemical properties. Further the $AlCl_3$/MEIC melt exhibit better properties than the $AlCl_3$/BPC melt. For example the $AlCl_3$/BPC melt has a relatively narrow electrochemical window, due to the reduction of the butylpyridinium cation, while melts containing MEIC have a wider electrochemical window. The electrical conductivities of the ambient temperature melts range from approximately 2 to 17 mS/cm, at 25° C.

When these molten salts are used in applications that involve strong oxidizing agents, such as in high voltage batteries, the organic cation should preferably be stable towards strong oxidation. The stability of the organic cation towards oxidation can be determined by observing the reactivity of $SCl_3^+$ ion with the melt, by Raman spectroscopy. The $SCl_3^+$ ion is a very strong oxidizing agent. Therefore, cells constructed with cathodes containing the $SCl_3^+$ ion have produced rechargeable cells with a voltage >4.2 V, which is among the highest voltages known for rechargeable cells. Studies of the stability of the $SCl_3^+$ ion in the presence of the 1-methyl-3-ethylimidazolium cation ($MEI^+$) showed that the $SCl_3^+$ ion decomposed rapidly at ambient temperature (25° C.). In the presence of the butylpyridinium cation ($BP^+$) the $SCl_3^+$ ion appeared to be more stable. When tested at 60° C., the concentration of the $SCl_3^+$ ion decreased approximately 87% in 6 days (i.e. approximately 15% per day). Therefore, there is a need for molten salt compositions which will be able to tolerate the presence of strong oxidizing agents over a wide temperature gradient.

OBJECTS OF THE INVENTION

Accordingly, it is an object of the present invention to provide a new and improved electrochemical cell.

It is an object of the present invention to provide a new and improved electrochemical cell comprising an anode, a cathode, and a low temperature molten electrolyte composition comprising a mixture of a metal halide and a fluoropyrazolium salt.

It is an object of the present invention to provide a new and improved electrochemical cell comprising an anode, a cathode, and a low temperature molten electrolyte composition comprising a mixture of a first metal halide, a second metal halide, and a fluoropyrazolium salt.

It is an object of the present invention to provide a new and improved electrochemical cell comprising an anode, a cathode, and a low temperature molten electrolyte composition consisting essentially of a mixture of a metal halide and a fluoropyrazolium salt.

It is an object of the present invention to provide a new and improved electrochemical cell comprising an anode, a cathode, and a low temperature molten electrolyte composition consisting essentially of a mixture of a first metal halide, a second metal halide, and a fluoropyrazolium salt.

It is another object of the present invention to provide a new and improved battery.

It is another object of the present invention to provide a new and improved battery comprising an anode, a cathode, and a low temperature molten electrolyte composition comprising a mixture of a metal halide and a fluoropyrazolium salt.

It is another object of the present invention to provide a new and improved battery comprising an anode, a cathode, and a low temperature molten electrolyte composition comprising a mixture of a first metal halide, a second metal halide, and a fluoropyrazolium salt.

It is another object of the present invention to provide a new and improved battery comprising an anode, a cathode, and a low temperature molten electrolyte composition consisting essentially of a mixture of a metal halide and a fluoropyrazolium salt.

It is another object of the present invention to provide a new and improved battery comprising an anode, a cathode, and a low temperature molten electrolyte composition consisting essentially of a mixture of a first metal halide, a second metal halide, and a fluoropyrazolium salt.

It is another object of the present invention to provide a new and improved low temperature molten electrolyte composition comprising a mixture of a metal halide and a fluoropyrazolium salt.

It is another object of the present invention to provide a new and improved low temperature molten electrolyte composition comprising a mixture of a first metal halide, a second metal halide, and a fluoropyrazolium salt.

It is another object of the present invention to provide a new and improved fused salt composition comprising a mixture of a metal halide and a fluoropyrazolium salt.

It is another object of the present invention to provide a new and improved fused salt composition comprising a mixture of a first metal halide, a second metal halide, and a fluoropyrazolium salt.

It is another object of the present invention to provide a new and improved low temperature fused salt composition comprising a mixture of a metal halide and a fluoropyrazolium salt.

It is another object of the present invention to provide a new and improved low temperature fused salt composition comprising a mixture of a first metal halide, a second metal halide, and a fluoropyrazolium salt.

It is another object of the present invention to provide a new and improved molten salt composition comprising a mixture of a metal halide and a fluoropyrazolium salt.

It is another object of the present invention to provide a new and improved molten salt composition comprising a mixture of a first metal halide, a second metal halide, and a fluoropyrazolium salt.

It is another object of the present invention to provide a new and improved low temperature molten salt composition comprising a mixture of a metal halide and a fluoropyrazolium salt.

It is another object of the present invention to provide a new and improved low temperature molten salt composition comprising a mixture of a first metal halide, a second metal halide, and a fluoropyrazolium salt.

It is another object of the present invention to provide a new and improved low temperature molten composition comprising a mixture of a metal halide and a fluoropyrazolium salt.

It is another object of the present invention to provide a new and improved low temperature molten composition comprising a mixture of a first metal halide, a second metal halide, and a fluoropyrazolium salt.

Further and other objects of the present invention will become apparent from the description contained herein.

SUMMARY OF THE INVENTION

In accordance with one aspect of the present invention, the foregoing and other objects are achieved by:

A low temperature molten composition comprising a mixture of a metal halide and fluoropyrazolium salt.

In accordance with another object of the present invention, the foregoing and other objects are achieved by:

An electrochemical cell comprising:

(a) an anode;

(b) a cathode; and (c) a low temperature molten electrolyte composition comprising a mixture of a metal halide and a fluoropyrazolium salt.

In accordance with another object of the present invention, the foregoing and other objects are achieved by:

An electrochemical cell comprising:

(a) an anode;

(b) a cathode; and (c) a low temperature molten electrolyte composition consisting essentially of a mixture of a metal halide and a fluoropyrazolium salt.

In accordance with another object of the present invention, the foregoing and other objects are achieved by:

A low temperature molten composition comprising a mixture of a first metal halide, a second metal halide and fluoropyrazolium salt.

In accordance with another object of the present invention, the foregoing and other objects are achieved by:

An electrochemical cell comprising:

(a) an anode;

(b) a cathode; and (c) a low temperature molten electrolyte composition comprising a mixture of a first metal halide, a second metal halide, and a fluoropyrazolium salt.

In accordance with another object of the present invention, the foregoing and other objects are achieved by:

An electrochemical cell comprising:

(a) an anode;

(b) a cathode; and (c) a low temperature molten electrolyte composition consisting essentially of a mixture of a first metal halide, a second metal halide, and a fluoropyrazolium salt.

DETAILED DESCRIPTION OF THE PREFERRED EMBODIMENT

Figure 1:
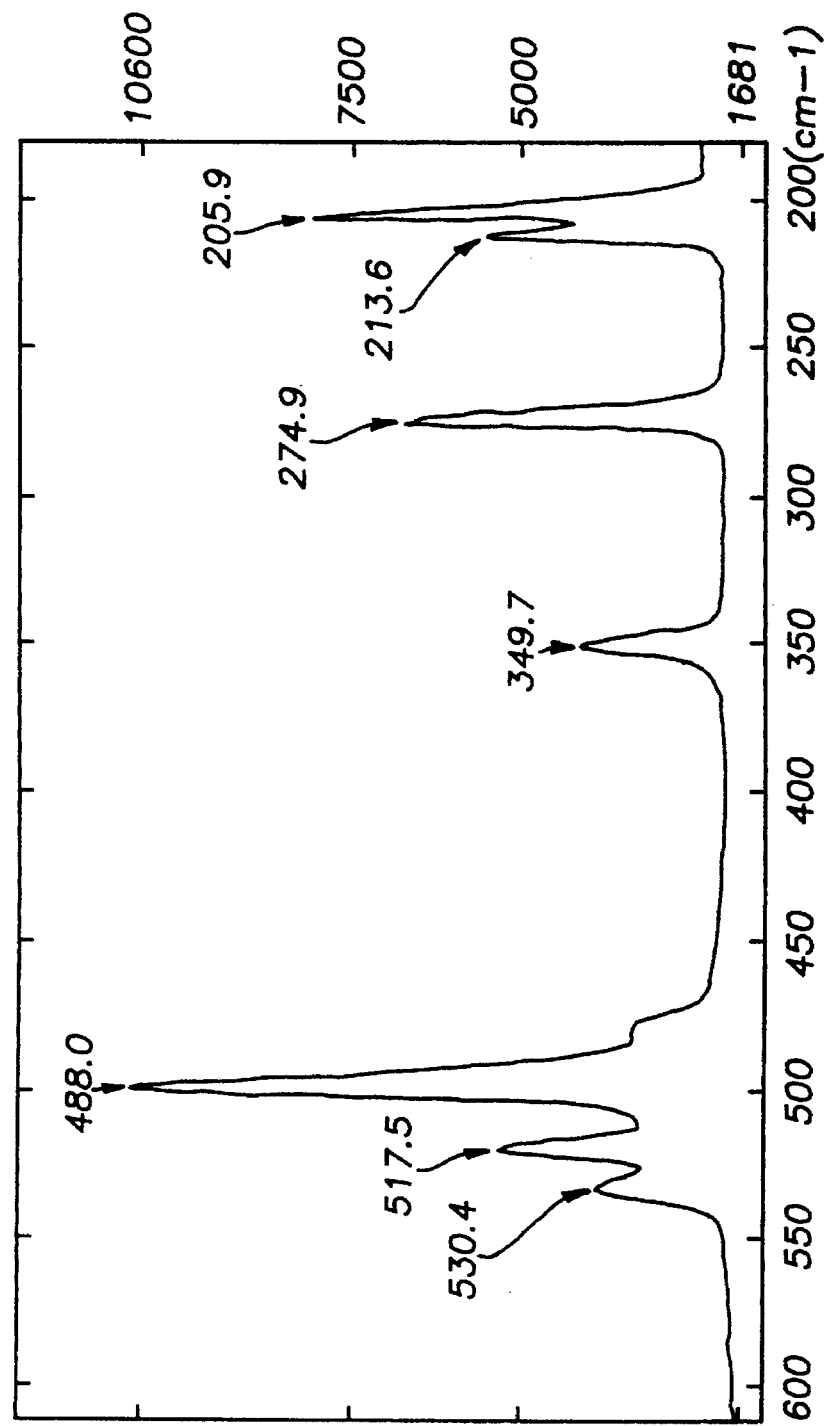
FIG. 1 is a Raman spectrograph of the solid $SCl_3AlCl_4$ above the interphase at 25° C.

The present invention discloses improved ambient or low temperate molten salt compositions for use in electrochemical cells, especially high voltage electrochemical cells. The stability of the $SCl_3^+$ ion in the presence of a fluoropyrazolium cation, specifically 1,2-dimethyl-4-fluoropyrazolium chloride (DMFP), was tested at 80° C., which is 20° C. higher than the temperature used in the experiment with the butylpyridinium cation and 55° C. higher than the temperature used in the experiment with the $MEI^+$ cation. It was observed that there was no decomposition of the $SCl_3^+$ ion after 3 hours at 80° C.; after 3 days at 80° C., approximately 15% decomposition was observed (i.e., approximately 5% per day). The observed lower rate of decomposition at a higher temperature shows that the fluoropyrazolium cation is significantly more stable towards strong oxidizing agents than the butylpyridinium cation and the $MEI^+$ cation.

Imidazoles and their salts are very reactive towards oxidation and towards electrophilic agents. To obtain higher stability towards oxidation, hydrogen on the aromatic ring can be replaced by an electron withdrawing group, or another more stable heterocycle can be used. The fluoropyrazolium salt was, therefore, selected, since pyrazole is more stable towards oxidation than imidazole, and fluorine being an electron withdrawing group could provide additional stability. Pyrazoles are generally defined as any of the group of heterocyclic compounds containing three carbon atoms, two adjacent nitrogen atoms, and two double bonds in the ring. They have the general empirical formula of $C_3H_4N_2$, and the general structural formula indicated below:

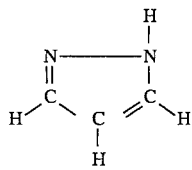

The general structural formula for a fluoropyrazolium salt, specifically a 4-fluoropyrazolium salt, is indicated below:

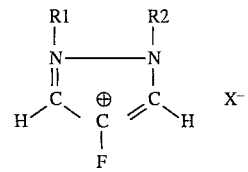

wherein R1 is independently an alkyl group consisting of 1–12 carbon atoms, R2 is independently an alkyl group consisting of 1–12 carbon atoms, and $X^-$ is an anion which is preferably a halide or halogen containing complex ion. The present invention envisions the use of many different types of fluoropyrazolium cations in conjunction with many different types of anions.

The compound 1,2-dimethyl-4-fluoropyrazolium chloride (DMFP) was synthesized from N-methylpyrazole by a three step process: (1) Direct fluorination of N-methylpyrazole using elemental fluorine to produce 1-methyl-4-fluoropyrazole, (2) Methylation of 1-methyl-4-fluoropyrazole using dimethylsulfate to form 1,2-dimethyl-4-fluoropyrazolium sulfate, and (3) Anion exchange to produce DMFP. The structural formula of DMFP chloride is depicted below:

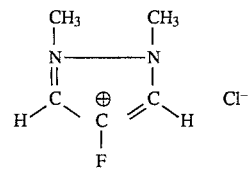

It has been previously observed that substitution of one of the methyl groups in dimethylimidazolium chloride with larger alkyl groups decreased its melting point as well as the melting point of the melt.

The composition and purity of DMFP as well as of $AlCl_3$/DMFP melts were established by proton, $^{19}F$ and $^{13}C$ nuclear magnetic resonance (NMR) and by elemental analysis. Elemental analysis of the DMFP revealed the following results: 39.92% C, 18.57% N, 5.20% H, 23.58% Cl, and 12.69% F (theoretical values are 39.88% C, 18.61% N, 5.32% H, 23.56% Cl, and 12.63% F). Melting point was 262°–264° C. (bec.). The structural formula of the $AlCl_3$/DMFP melt is depicted below:

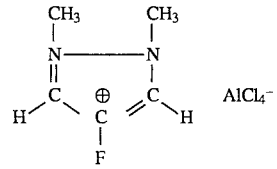

Five aluminum chloride/DMFP melts of acidic (an acidic melt is defined as a melt with the ratio $AlCl_3$/DMFP>1), basic (ratio $AlCl_3$/DMFP<1), and neutral (ratio $AlCl_3$/DMFP=1) compositions were prepared. These consisted of one basic (composition $AlCl_3$/DMFP=45/55 mole %), three acidic (compositions 55/45, 60/40, and 65/35), and the neutral (composition 50/50) melt. The melts (300 mg each) were prepared by stirring aluminum chloride and DMFP at approximately 80° C. for about 24 h, until all the solid had dissolved. Next the melts were transferred into sample tubes (ID=2 mm), frozen in liquid nitrogen, evacuated and sealed.

Three of the five melts prepared above were analyzed by Raman spectroscopy. They were, the acidic melt with the composition AlCl$_3$/DMFP=65/35 mole %, the neutral melt, and the basic melt. The spectrum of the acidic melt showed a band at 314 nm due to the Al$_2$Cl$_7^-$ ion, and a band at 348 nm due to the AlCl$_4^-$ ion. Both the neutral and the basic melts also showed a band at 348 nm due to the AlCl$_4^-$ ion. It should be noted that all spectra showed bands at approximately 584 nm, which may be due to the 1,2-dimethyl-4-fluoropyrazolium cation. These spectra indicate that the acid-base equilibria in AlCl$_3$/DMFP melts are similar to those in the other chloroaluminate melts.

Preliminary experiments showed that all the melts except for the neutral melt had a tendency to supercool; hence, the melting rather than the freezing temperatures were determined. First, the samples were frozen in liquid nitrogen and then, they were transferred into an ice bath. The ice bath was slowly heated and the solid to liquid transitions were determined visually. When heated from 0° C., the crystalline phases of the 65/35 mole % AlCl$_3$/DMFP melt turned into a transparent phase at approximately 12° C. This phase showed no tendency to flow when the sample tube was inverted. Hence the above phase transition is, most likely, a solid to glass transition. Similar supercooling as well as solid to glass transitions have been observed with AlCl$_3$/MEIC melts. The other two acidic melts showed both liquid and solid phases over a wide temperature range. The Table below illustrates the melting and glass transition temperatures of the five AlCl$_3$/DMFP melts.

TABLE

| Composition AlCl$_3$/DMFP mole % | 65:35 | 60:40 | 55:45 | 50:50 | 45:55 |
|---|---|---|---|---|---|
| Complete Melting °C. | 12$^a$ | 49 | 60 | 80 | 77 |
| Liquid/Solid range °C. | | 20–49 | 20–60 | | 73–77 |

$^a$Glass transition

The conductivity, density, and the electrochemical window of the 65/35 mole % AlCl$_3$/DMFP melt was determined at 30° C. The conductivity was 5 mS/cm and the density was 1.5 g/cm$^3$. The density may be compared with the density (1.38 g/cm$^3$) of 67/33 mole % AlCl$_3$/MEIC melt, at 30° C. The electrochemical window was determined by cyclic voltammetry using a Pyrex glass cell which contained working and counter electrodes made of tungsten. A glass frit separated the counter electrode from the cathode compartment. The reference electrode was an Al wire immersed in a 65/35 mole % AlCl$_3$/DMFP melt separated from the cathode compartment by a fine glass frit. The electrochemical window of the 65/35 mole % AlCl$_3$/DMFP melt was determined to be from +2.7 V to 0.0 V. For comparison the electrochemical window of 65/35 mole % AlCl$_3$/MEIC melt was also determined to be about +2.6 V to 0.0 V, under identical conditions. Therefore the results show that the electrochemical window is somewhat more positive for the AlCl$_3$/DMFP melt than for the AlCl$_3$/MEIC melt.

For lithium cells consisting of a lithium or a Li$_x$C anode, the cathode requires a soluble lithium salt in the AlCl$_3$/DMFP melt so that the lithium ions can be the primary charge carriers in the melt. The cathodes that can be used with high voltage rechargeable cells containing AlCl$_3$/DMFP melt with dissolved lithium salts as the electrolyte include, Li$_x$Mn$_2$O$_4$, Li$_x$CoO$_2$, Li$_x$NiO$_2$, Li$_x$MnO$_2$, Li$_x$V$_2$O$_5$, Li$_x$V$_6$O$_{13}$, Li$_x$TiS$_2$, as well as SCl$_3$AlCl$_4$. With cathodes such as SCl$_3$AlCl$_4$ where the chloroaluminate melt takes part in the oxidation-reduction reactions, the electrolyte will have a neutral (i.e. AlCl$_3$/(DMFP+LiCl)=1) or a slightly acidic (i.e. AlCl$_3$/(DMFP+LiCl)>1) composition in the discharged state and an acidic composition in the charged state.

It was observed that the addition of lithium chloride to AlCl$_3$/DMFP melts produced melts having lower melting points than those having the same aluminum trichloride composition. The melting points can be decreased further by replacing one of the methyl groups with a larger alkyl group. Some of the alkyl groups that can be used for substitution include, ethyl, butyl, pentyl, hexyl, heptyl, octyl, nonyl, decyl, undecyl and dodecyl.

In order to determine whether a neutral AlCl$_3$/(DMFP+LiCl) melt could be prepared by dissolving LiCl in an acidic AlCl$_3$/DMFP melt, a 65/35 mole % AlCl$_3$/DMFP melt was first prepared in a dry box by heating a mixture of 0.220 g (0.00165 mole) of AlCl$_3$ and 0.132 g (0.000877 mole) of DMFP in an Erlenmeyer flask at 80° C. for 24 h. Next the LiCl (0.042 g, 0.00099 mole) was added to the melt in two portions. The quantity of LiCl added was slightly more than the amount required (0.000773 mole) for complete neutralization. It was observed that the first portion (0.015 g) dissolved easily in about five minutes. However, only a part of the second portion (0.027 g) dissolved easily. To dissolve the rest of the LiCl the Erlenmeyer flask was heated to 100° C. for two days, when most of the LiCl dissolved; only a few crystals were left at the bottom of the flask. This shows that saturated (basic) or neutral AlCl$_3$/(DMFP+LiCl) melt can be prepared relatively easily by adding lithium chloride to an acidic AlCl$_3$/DMFP melt at approximately 100° C. Next the warm melt was transferred into a sample tube (ID=2 mm), frozen in liquid nitrogen, evacuated and sealed.

It was observed that the lithium chloride saturated, AlCl$_3$/(DMFP+LiCl) approximately 50/50 mole %, melt is a solid at ambient temperature. The sample in the sealed tube was slowly heated in a water bath and the solid-to-liquid transition was determined visually. The solid began to melt at about 51° C. and the melting was complete at 54° C. This is in contrast to the 80° C. melting point observed earlier for the AlCl$_3$/DMFP=50/50 mole % melt. Additional experiments showed that a 55/45 mole % AlCl$_3$/(DMFP+LiCl) melt, with the DMFP/LiCl molar ratio=1.42, was a liquid at 27° C., while the 55/45 mole % AlCl$_3$/DMFP melt completely melts only at 60° C.

Figure 2:
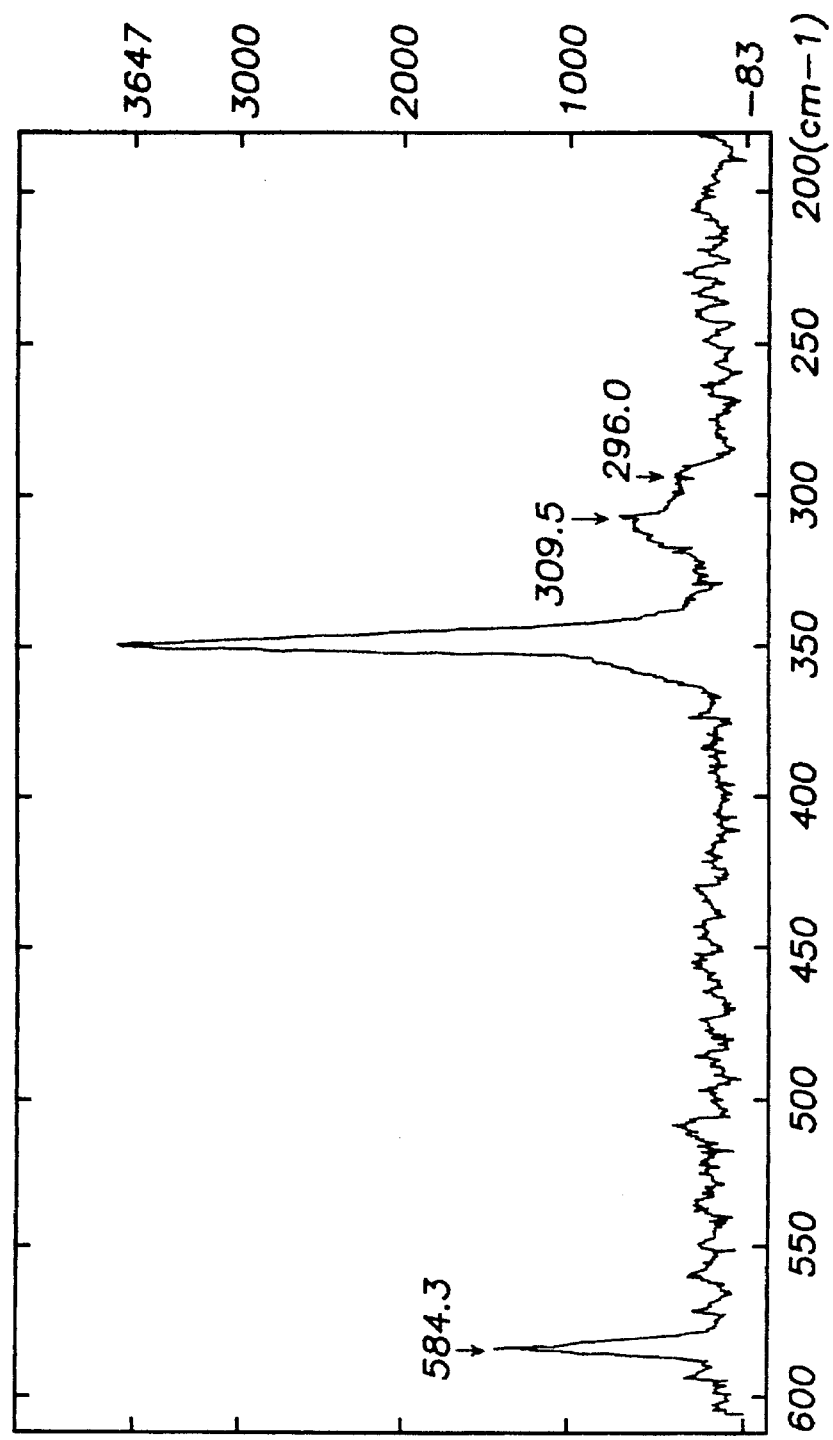
FIG. 2 is a Raman spectrograph of the slightly acidic $AlCl_3$/DMFP (52/48 mole %) melt below the interphase at 25° C.

In order to determine the stability of the SCl$_3^+$ ion in the presence of the 1,2-dimethyl-4-fluoropyrazolium cation, an acidic AlCl$_3$/DMFP melt (composition AlCl$_3$/DMFP=52/48 mole %) was prepared by mixing 0.1525 g (1.01 mmole) of DMFP and 0.147 g (1.10 mmole) of AlCl$_3$ in an Erlenmeyer flask at about 80° C. After leaving the slightly colored homogeneous melt overnight in a dry box at ambient temperature, it was reheated to 80° C. and mixed once again. The liquid was cooled to ambient temperature, and the resulting solid was transferred to a sample tube (ID=2 mm). Solid SCl$_3$AlCl$_4$ (0.10 g; 0.325 mmole) was added on top of the melt in the sample tube. Next the sample tube was cooled in liquid nitrogen, evacuated and sealed. During the next few hours it was observed that mixing of SCl$_3$AlCl$_4$ and the solidified melt at room temperature caused slight discoloration of the interphase between the two solids. The Raman spectrum of the solid SCl$_3$AlCl$_4$ above the interphase (FIG. 1) shows bands at 530, 518, 498, 480, 275, 214 and 206 nm due to SCl$_3^+$ cation and a band at 350 nm due to the AlCl$_4^-$ ion. The Raman spectrum of the slightly acidic AlCl$_3$/DMFP melt below the interphase (FIG. 2) shows bands at 350 and 310 nm due to the AlCl$_4^-$ and the Al$_2$Cl$_7^-$ ions, respectively. The band at 584 nm is most likely due to the DMFP cation.

Figure 3:
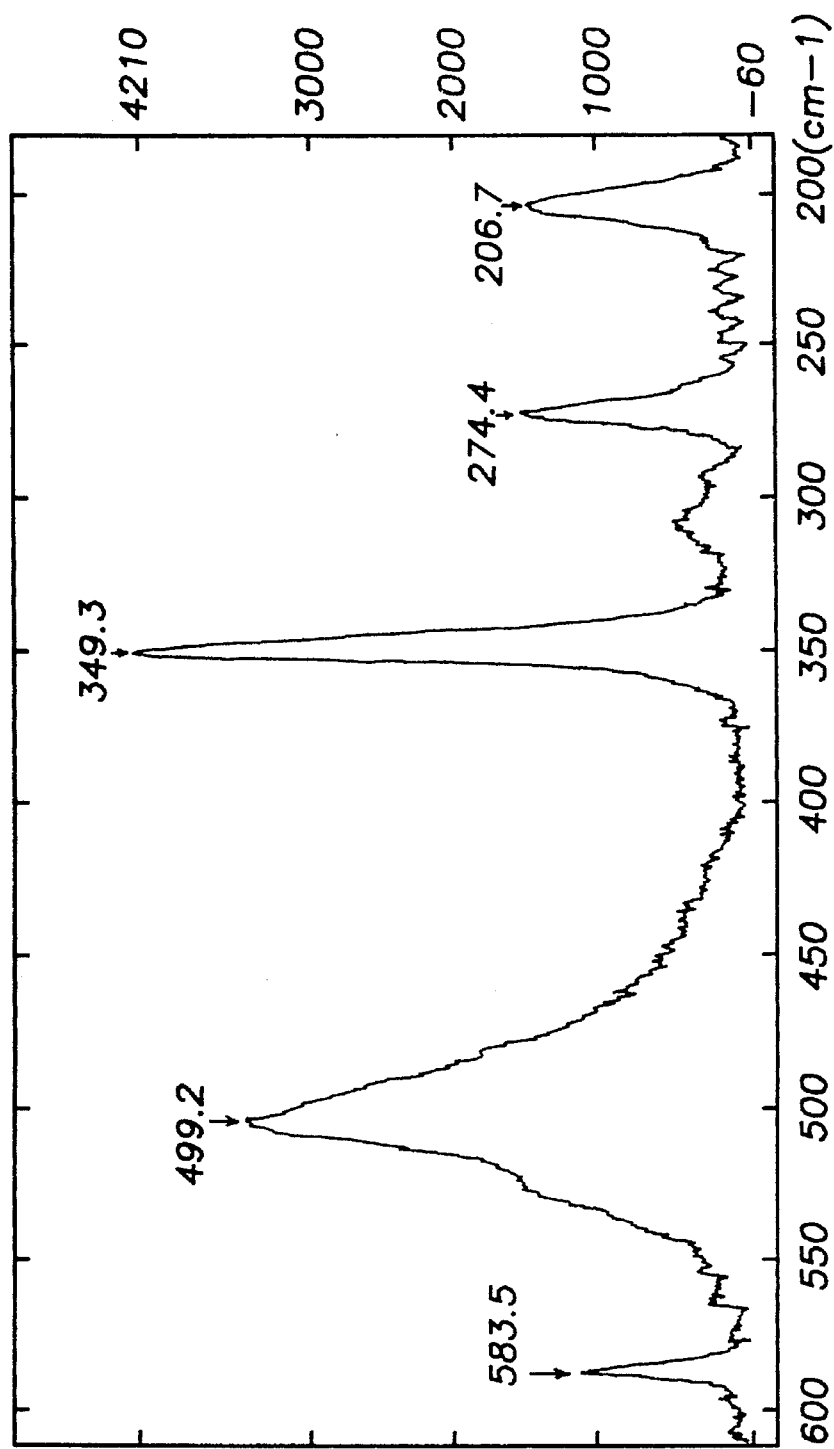
FIG. 3 is a Raman spectrograph of the slightly acidic $AlCl_3$/DMFP (52/48 mole %) melt containing dissolved $SCl_3AlCl_4$ after one hour at 80° C.
Figure 4:
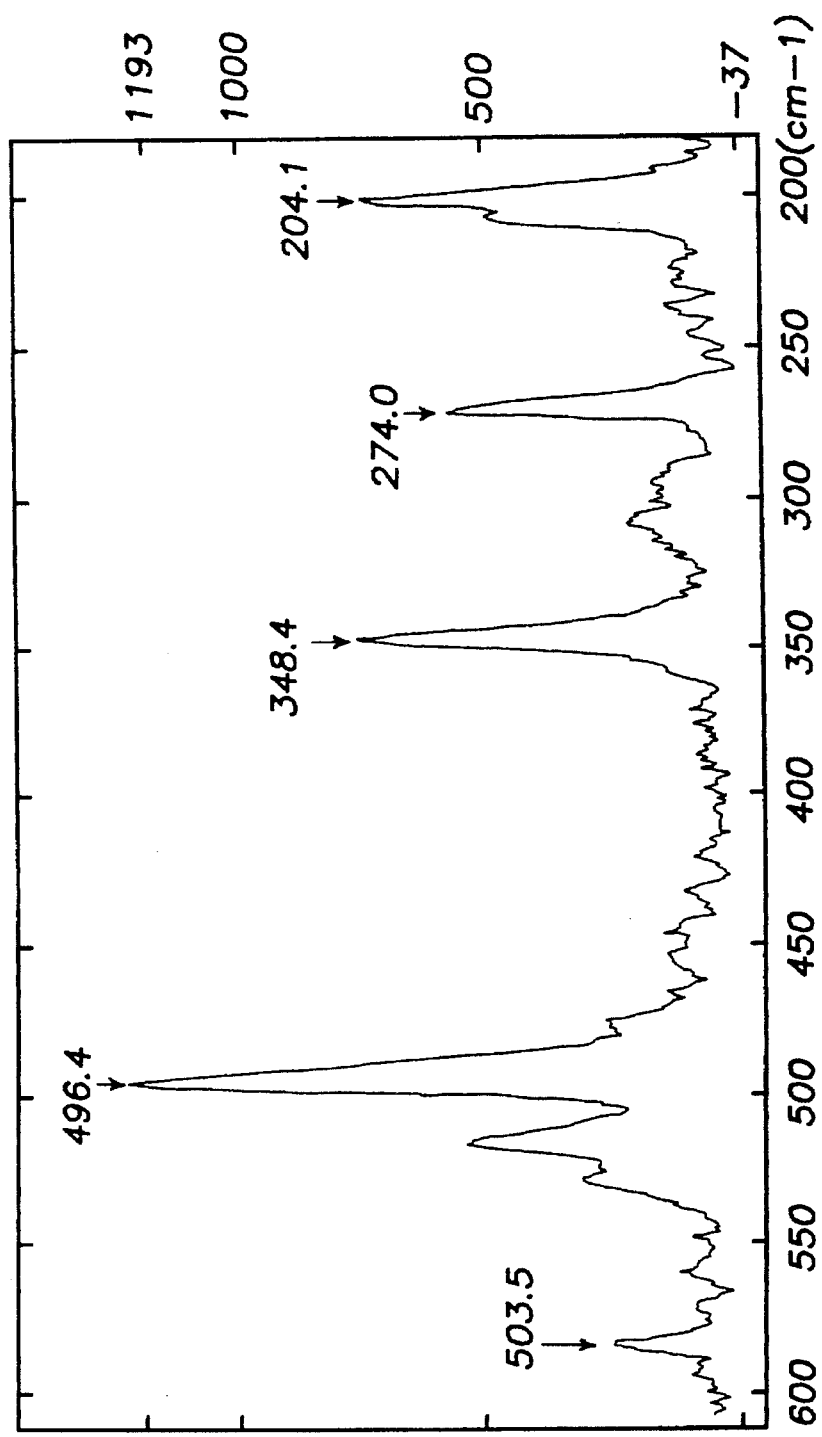
FIG. 4 is a Raman spectrograph of the slightly acidic $AlCl_3$/DMFP (52/48 mole %) solid containing dissolved $SCl_3AlCl_4$ after cooling to 25° C.
Figure 5:
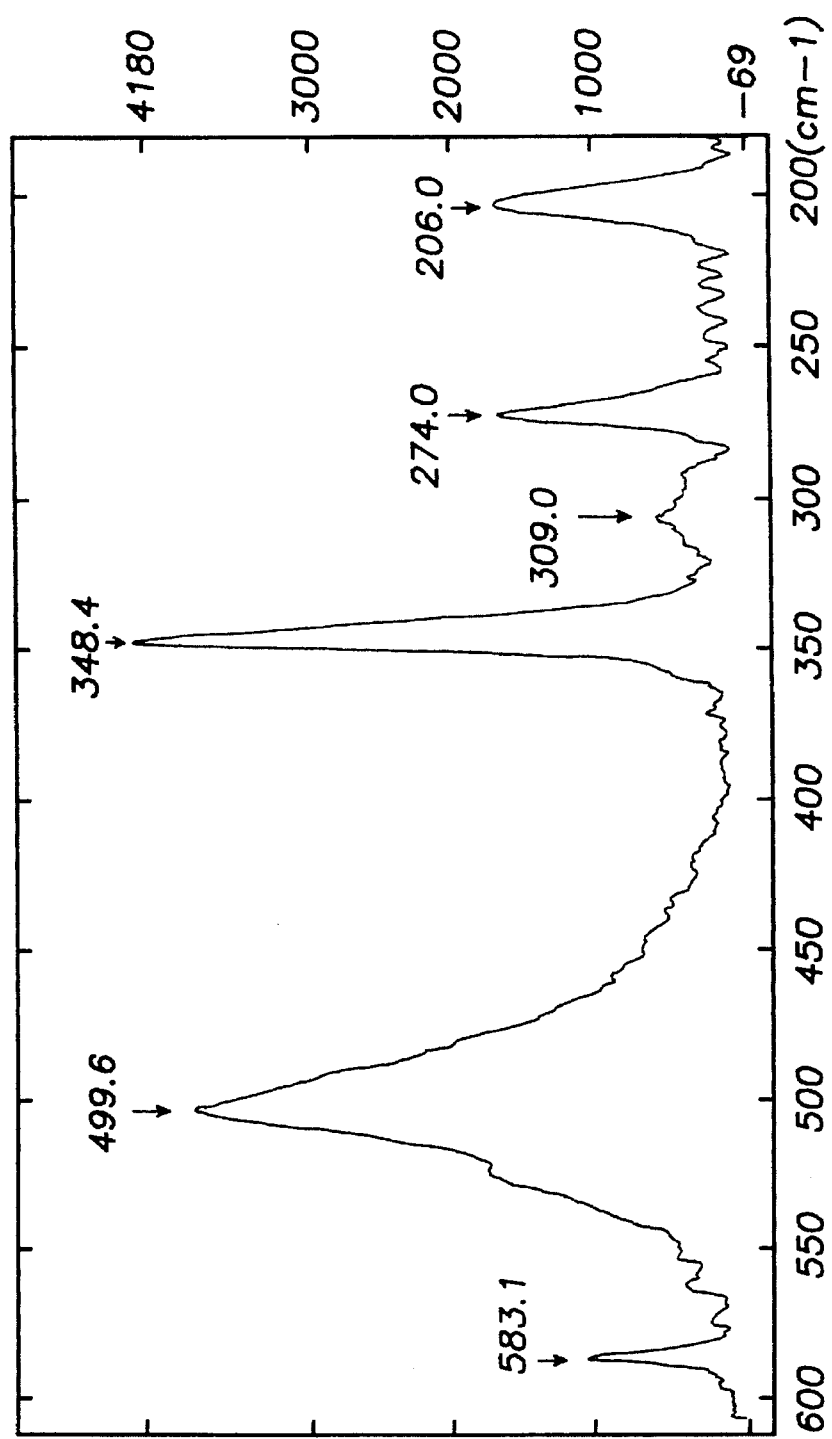
FIG. 5 is a Raman spectrograph of the slightly acidic $AlCl_3$/DMFP (52/48 mole %) solid containing dissolved $SCl_3AlCl_4$ after four hours at 80° C.
Figure 6:
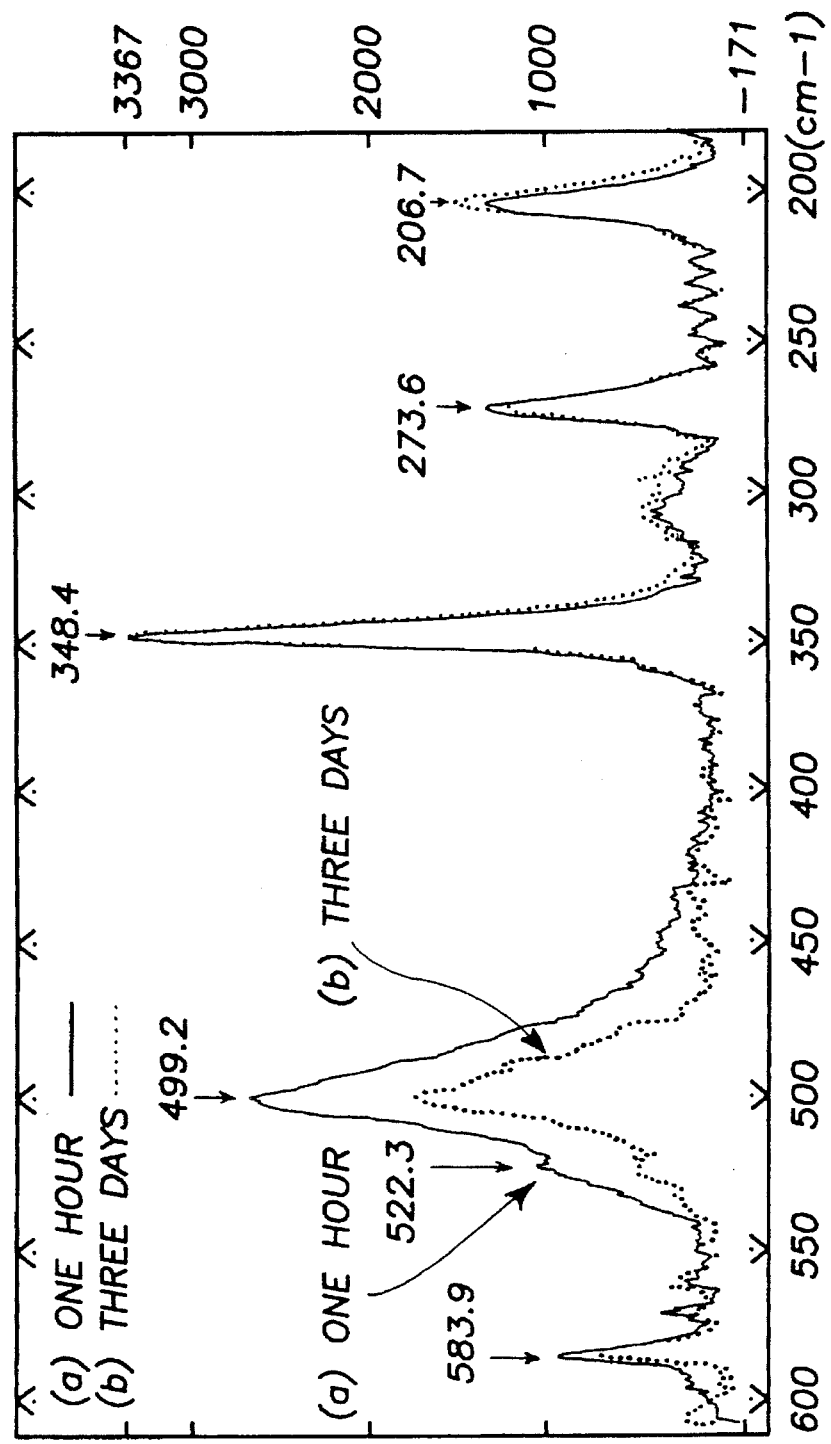
FIG. 6 is a Raman spectrograph comparing the slightly acidic $AlCl_3$/DMFP (52/48 mole %) solid containing dissolved $SCl_3AlCl_4$ after (a) one hour (–) and (b) three days at 80° C. ( - - - ).

The sample was heated to 85°–90° C. and the SCl$_3$AlCl$_4$ was dissolved in the melt. It was observed that most of the $SCl_3AlCl_4$ (approximately 80 mg) dissolved in the melt in about 30 minutes. The Raman spectrum of the liquid was taken after keeping the sample at 80° C. for approximately 1 hour (FIG. 3). The spectrum shows a broad band at 499 nm, together with bands at 274 and 207 nm due to the $SCl_3^+$ ion in solution. The liquid was cooled and the Raman spectrum of the resulting solid was taken (FIG. 4). It shows the bands observed before due to the $SCl_3^+$ ion in the solid $SCl_3AlCl_4$. This clearly shows that the $SCl_3^+$ ion is stable in the acidic $AlCl_3$/DMFP melt at 80° C. for 1 hour. Another Raman spectrum (FIG. 5) taken after an additional 3 hours at 80° C. shows that within experimental error, there is no change in the concentration of the $SCl_3^+$ ion in solution over the 3 hour period. These results are in contrast to previous results which showed that $SCl_3AlCl_4$ reacted rapidly with the acidic $AlCl_3$/MEIC melts even at ambient temperature. In FIG. 6 another Raman spectrum taken after keeping the sample at 80° C. for three days is compared with the spectrum observed after 1 hour. The intensity of the band at 499 nm decreased approximately 15% compared with the band observed after 1 hour at 80° C. However, new bands due to any decomposition products of $SCl_3^+$ were not observed. Therefore, these results show that $SCl_3AlCl_4$, a strong oxidant, is sufficiently stable in acidic $AlCl_3$/DMFP melts at 80° C., to permit the construction of rechargeable cells. It is also likely that the stability is greater at lower temperatures.

An example of an electrochemical cell, in accordance with one aspect of the present invention, is presented below:

EXAMPLE 1

An acidic melt (55/45 mole % $AlCl_3$/(DMFP+LiCl)) was prepared by mixing 4.72 g (0.0354 mole) of $AlCl_3$ with 2.53 g (0.0168 mole) of DMFP and 0.50 g (0.0118 mole) of LiCl. It was observed that this melt is a liquid at ambient temperature (27° C.).

The lithium exchanged β"-alumina tube was wrapped with lithium foil (1.41 g), and was placed in a glass cup so that the lithium was pressed against the tungsten coil current collector in the outer anode compartment. Next, 7.43 g of the choroaluminate melt was transferred into the β"-alumina tube together with 0.07 g of sulfur (theoretical capacity 233 mAh). Finally, the cell assembly was completed by placing the Teflon™ cover carrying the tungsten coil cathode current collector on top of the glass cup.

The cell was operated at ambient temperature (27° C.) in a dry box. The cell, assembled in the discharged state, showed an open circuit voltage (OCV) of 3.13 V. This voltage may be compared to the OCV (~3.6 V) of the cell Na/β"-alumina/S(IV) in $AlCl_3$/NaCl melt at 230° C. in the discharged state. At the beginning of charging the cell resistance was very high; however, it decreased significantly during charging. This high resistance was expected due to the high resistance of the Li-β"-alumina at ambient temperature (ionic conductivity $10^{-4}$ ohm$^{-1}$cm$^{-1}$ at 25° C.), due to polarization at the β"-alumina/chloroaluminate melt interface, and also due to partial exchange of $Na^+$ ion in the β"-alumina by $Li^+$ ion. In addition, the contact resistance between the β"-alumina surface and the lithium anode may also be significant. Because of high resistance, the cell was only partially charged (40 mAh during the first cycle) and discharged. The charged cell had an OCV of ~4.0 V. The voltage of the charged cell was stable and remained unchanged for 9 hours. The OCV of the discharged cell was ~3.1 V. Charge/discharge efficiency was ~30%. The low charge/discharge efficiency is most likely due to the open construction of the cathode compartment. Oxidation of sulfur in the chloroaluminate melt leads to the formation of $S_2Cl_2$ and eventually $SCl_3AlCl_4$. $S_2Cl_2$ is a liquid at ambient temperature, and hence could be lost from the cathode compartment because it is not sealed. An example of an electrochemical cell, in accordance with another aspect of the present invention, is presented below:

EXAMPLE 2

The construction of this cell using a lithium exchanged β"-alumina tube was similar to that used in Example 1. However, this cell was assembled in the charged state. In order to improve contact between the lithium anode (1.42 g) and the β"-alumina surface, lithium foil was rubbed onto the surface. The β"-alumina tube contained 5.6 g of 61/39 mole % $AlCl_3$/(DMFP+LiCl) melt. Molar ratio of DMFP to LiCl in the melt was 2.5:1. It was observed that this melt was liquid at ambient temperature (~27° C.). The OCV of the cell before the addition of $SCl_3AlCl_4$ was 2.78 V. After the addition of $SCl_3AlCl_4$ (0.27 g; cell capacity 94 mAh) to the melt the cell had an OCV of 4.13 V. This voltage remained unchanged for 2 hours. This voltage compares well with the OCV of the Li/S(IV) thermal cell (4.03 V) and the OCV of 4.09 V calculated based on the reduction potential (−2.14 V) of Li in $AlCl_3$/MEIC melt and the oxidation potential (1.95 V) of $SCl_3^+$ in $AlCl_3$/NaCl melt, both measured versus an Al/Al(III) reference electrode. Operation of this cell also was performed at ambient temperature (~27° C.) in a dry box. As with the cell in Example 1 which was assembled in the discharged state, the solubility of $SCl_3AlCl_4$ in the melt at ambient temperature has not been investigated. However, the quality of $SCl_3AlCl_4$ added to the cathode compartment (48 mg/g of the melt) is significantly less than the amount of $SCl_3AlCl_4$ dissolved in the 52/48 mole % added $AlCl_3$/DMFP melt (266 mg/g of the melt) at 80° C. This cell also showed high resistance during charge (~22 kohm) and discharge. Due to the high cell resistance, the cell was charged using very low constant currents (~0.15 mA) and discharged using a resistor of 33 kohm (discharge current= 0.2–0.3 mA). Due to the use of very low currents, the cell was charged and discharged only partially.

After the initial discharge, this cell has been partially charged and discharged seven times. For example, during the second cycle the cell was charged 0.44 mAh when the OCV reached 4.08 V. When it was discharged 0.20 mAh the cell had an OCV of 3.22 V. Thus the charge/discharge efficiency was 45%. It was also observed that the OCV of the charged cell was stable for over 18 hours. Again, during the sixth cycle the cell was charged 0.45 mAh when the OCV reached 4.06 V. Next the cell was discharged 0.2 mAh when the OCV reached 3.19 V (charge/discharge efficiency 44%).

Molten salt compositions containing fluoropyrazolium cation will be useful as electrolytes in electrochemical cells, batteries, photoelectrochemical cells, electrorefining, electroplating, and in capacitors.

While there has been shown and described what are at present considered the preferred embodiments of the invention, it will be obvious to those skilled in the art that various changes and modifications can be made therein without departing from the scope of the invention defined by the appended claims.

What is claimed is:

1. A ambient temperature molten composition comprising a mixture of a metal halide and fluoropyrazolium salt.

2. The composition of claim 1, wherein the metal of the metal halide is selected from the group consisting aluminum, gallium, iron, and indium.

3. The composition of claim 2, wherein the metal halide is aluminum trichloride.

4. The composition of claim 3, wherein the fluoropyrazolium salt is 1,2-dimethyl-4-fluoropyrazolium chloride.

5. The composition of claim 1, wherein the fluoropyrazolium salt corresponds to the structural formula:

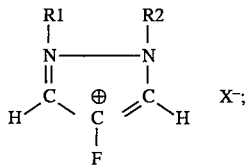

wherein
R1 is independently an alkyl group consisting of 1–12 carbon atoms;
R2 is independently an alkyl group consisting of 1–12 carbon atoms; and
X⁻ is an anion which is a halide or halogen containing complex ion.

6. The composition of claim 5, wherein X is Cl⁻.

7. The composition of claim 6, wherein the fluoropyrazolium salt is 1,2-dimethyl-4-fluoropyrazolium chloride.

8. An electrochemical cell comprising:
(a) an anode;
(b) a cathode; and
(c) a ambient temperature molten electrolyte composition comprising a mixture of metal halide and a fluoropyrazolium salt.

9. The electrochemical cell of claim 8, wherein the metal of the metal halide is selected from the group consisting of aluminum, gallium, iron, and indium.

10. The electrochemical cell of claim 9, wherein the metal halide is aluminum trichloride.

11. The electrochemical cell of claim 10, wherein the fluoropyrazolium salt is 1,2-dimethyl-4-fluoropyrazolium chloride.

12. The electrochemical cell of claim 8, wherein the fluoropyrazolium salt corresponds to the structural formula:

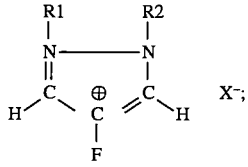

wherein
R1 is independently an alkyl group consisting of 1–12 carbon atoms;
R2 is independently an alkyl group consisting of 1–12 carbon atoms; and
X⁻ is an anion which is a halide or halogen containing complex ion.

13. The electrochemical cell of claim 12, wherein X is Cl⁻.

14. The electrochemical cell of claim 13, wherein the fluoropyrazolium salt is 1,2-dimethyl-4-fluoropyrazolium chloride.

15. A ambient temperature molten composition comprising a mixture of a first metal halide, a second metal halide, and fluoropyrazolium salt.

16. The composition of claim 15, wherein the metal of the first metal halide is selected from the group consisting of aluminum, gallium, iron, and indium.

17. The composition of claim 15, wherein the metal of the second metal halide is lithium.

18. The composition of claim 16, wherein the first metal halide is aluminum trichloride.

19. The composition of claim 17, wherein the second metal halide is lithium chloride.

20. The composition of claim 18, wherein the fluoropyrazolium salt is 1,2-dimethyl-4-fluoropyrazolium chloride.

21. The composition of claim 19, wherein the fluoropyrazolium salt is 1,2-dimethyl-4-fluoropyrazolium chloride.

22. The composition of claim 15, wherein the fluoropyrazolium salt corresponds to the structural formula:

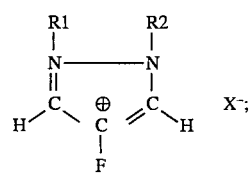

wherein
R1 is independently an alkyl group consisting of 1–12 carbon atoms;
R2 is independently an alkyl group consisting of 1–12 carbon atoms; and
X⁻ is an anion which is a halide or halogen containing complex ion.

23. The composition of claim 22, wherein X is Cl⁻.

24. The composition of claim 23, wherein the fluoropyrazolium salt is 1,2-dimethyl-4-fluoropyrazolium chloride.

25. An electrochemical cell comprising:
(a) an anode;
(b) a cathode; and
(c) a low temperature molten electrolyte composition comprising a mixture of a first metal halide, a second metal halide, and a fluoropyrazolium salt.

26. The electrochemical cell of claim 25, wherein the metal of the first metal halide is selected from the group consisting of aluminum, gallium, iron, and indium.

27. The electrochemical cell of claim 25, wherein the metal of the second metal halide is lithium.

28. The electrochemical cell of claim 26, wherein the first metal halide is aluminum trichloride.

29. The electrochemical cell of claim 27, wherein the second metal halide is lithium chloride.

30. The electrochemical cell of claim 28, wherein the fluoropyrazolium salt is 1,2-dimethyl-4-fluoropyrazolium chloride.

31. The electrochemical cell of claim 29, wherein the fluoropyrazolium salt is 1,2-dimethyl-4-fluoropyrazolium chloride.

32. The electrochemical cell of claim 25, wherein the fluoropyrazolium salt corresponds to the structural formula:

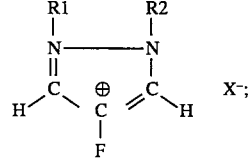

wherein
R1 is independently an alkyl group consisting of 1–12 carbon atoms;

R2 is independently an alkyl group consisting of 1–12 carbon atoms; and $X^-$ is an anion which is a halide or halogen containing complex ion.

33. The electrochemical cell of claim 32, wherein X is $Cl^-$.

34. The electrochemical cell of claim 33, wherein the fluoropyrazolium salt is 1,2-dimethyl-4-fluoropyrazolium chloride.

\* \* \* \* \*